United States Patent Office 3,812,165
Patented May 21, 1974

3,812,165
18-METHYL-5α-H-ANDROSTANE DERIVATIVES AND PROCESS OF MAKING THE SAME
Hans-Detlef Berndt, Hermann Steinbeck, and Rudolf Wiechert, Berlin, Germany, assignors to Schering Aktiengesellschaft, Berlin and Bergkamen, Germany
No Drawing. Filed Feb. 20, 1969, Ser. No. 801,158
Claims priority, application Germany, Feb. 24, 1968,
P 16 68 687.6
Int. Cl. C07c *169/22*
U.S. Cl. 260—397.4                               17 Claims

ABSTRACT OF THE DISCLOSURE

An androstane derivative having the formula:

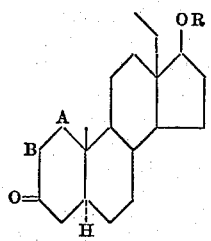

wherein A–B is a group selected from the following:

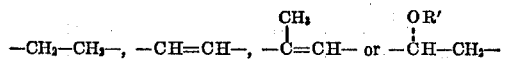

and R and R' are the same or different and are hydrogen or an acyl residue. The compounds have a strong anabolic action and show a good dissociation of the anabolic main action from the undesired androgenous side effect.

The compounds are made by reducing the 4,5-position of a $\Delta^4$,1-2-saturated corresponding steroid and, if desired, dehydrogenating the 1,2-position or introducing a methyl group into the 1-position.

BACKGROUND OF THE INVENTION

Steroid compositions having anabolic action which have found broad use are particularly the following:

17β-propionyloxy-4-androstene-3-one
17β-acetoxy-5α-androstane-3-one
17β-acetoxy-1-methyl-5α-androst-1-ene-3-one It appeared, however, desirable to obtain steroids with a stronger anabolic action. In addition, the compounds with an anabolic main action usually had an undesirable androgenic side effect. It appeared, therefore, desirable also to provide for compositions wherein a better dissociation is obtained between the anabolic main effect and the androgenic side effect.

SUMMARY OF THE INVENTION

These objects are met by an androstane derivative having the formula:

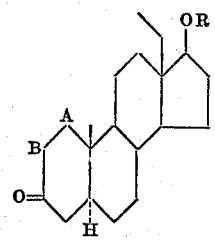

wherein A–B is one of the following groups:

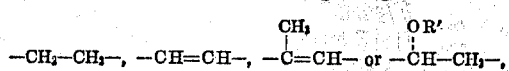

and wherein R and R' may be the same or different and are hydrogen or an acyl residue.

The compounds of the invention are made by reducing the 4,5-double bond of an 18-methyl-4-androstene-3-one steroid of the following composition:

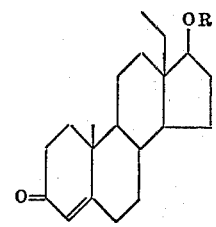

wherein R is hydrogen or an acyl residue. This initial process step may be followed by further steps to dehydrogenate the 1,2-position and to introduce a methyl group or a hydroxyl group into the 1-position and, depending on the intended final product, to acylate a free 17-hydroxyl group or saponify a 17-acyloxy group.

DESCRIPTION OF THE PREFERRED EMBODIMENTS

In the compounds of the invention, if R is an acyl residue, this term should be understood to include the acid residues of those acids which are customarily employed in steroid chemistry for esterification of free hydroxyl groups. The preferred residues are those of aliphatic carboxylic acids having from 1 to 11 carbon atoms in the acid residue, such as acetic acid, propionic acid, caproic acid, undecylic acid, etc. The acids can, of course, also be unsaturated, branched, polyhydroxy acids, or may be substituted in conventional manner. As examples may be mentioned trimethylacetic acid, t-butylacetic acid, phenylacetic acid, cyclopentylpropionic acid, halogenoacetic acid, aminoacetic acid, hydroxypropionic acid, benzoic acid, succinic acid, adipic acid, etc.

The compounds of the invention are preferably made by starting from an 18-methyl-4-androstene-3-one of the formula:

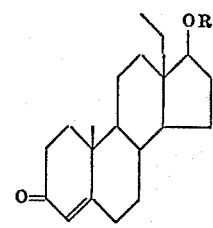

wherein R is hydrogen or an acyl residue. These compounds are subjected to a reduction of the 4,5-double bond, which may be effected in conventional manner. This may be followed by dehydrogenation of the 1,2-position and additionally by the introduction of a methyl group or a hydroxyl group into the 1-position. Depending on the ultimate product desired, a free 17-hydroxyl group may also be subjected to acylation or a 17-acyloxy group may be subjected to saponification.

The introduction of the 1α-hydroxyl group is preferably effected by forming an addition reaction at the $\Delta^1$-double bond with HO·Hal (Hal standing for halogen), for instance by means of N-bromosuccinimide or N-chloroacetamide. Following this reaction, the halogen atom in the 2-position is then removed by reduction.

Another possibility is to subject the $\Delta^1$-double bond to an epoxidation and then to open up the 1,2-epoxy ring in a reducing reaction. If desired, this may be done after temporary blocking of the 3-keto group, for instance with a complex metal hydride such as lithiumaluminumhydride. In order to dispense with the temporary 3-keto blocking, the reduction should preferably be carried out with lithium in liquid ammonia. It will of course be understood that if there is a subsequent esterification of a 17-hydroxyl group, the 1α-hydroxyl group will likewise be subject to the acylation.

The reduction of the 4,5-double bond preferably is also carried out with lithium in the medium of liquid ammonia, since in that case a maximum yield of the desired 5α-H-compound is obtainable. However, the reduction may also be carried out by an addition reaction involving hydrogen in the presence of a suitable metal catalyst such as palladium, which preferably should be used on a carbon carrier.

The subsequent dehydrogenation of the 1,2-position may likewise be effected in the conventional manner. A preferred method is to introduce in the first place a halogen atom, preferably bromine, into the 2-position and then to split this off again as the hydrogen halide by means of a reaction with calcium carbonate/lithium bromide in dimethylformamide. However, the introduction of the 1,2-double bond can also be effected by means of selenious acid or dicyanodicyclobenzoquinone or by means of established microbiological methods.

The introduction of the 1-methyl group can also be done in a manner generally known. For instance, methods may be used which are disclosed in German Pat. Nos. 1,023,764, 1,117,113 and 1,135,900.

These methods, which are also described in "Zeitschrift fuer Naturforschung," 19b, 944, 1964, are as follows:

Diazomethane is first introduced by an addition reaction into the 1,2-double bond. This is done by adding the corresponding $\Delta^1$-compound for instance to a cooled ether solution of diazomethane, whereby a solution of the compound takes place in the course of the reaction. After letting the reaction solution stand for a period of time, for instance between 20 and 60 hours, the pyrazoline compound is precipitated. Nitrogen is then split off from the thus formed 1,2-pyrazoline compound upon formation of the desired 1-methyl-$\Delta^1$-group. The splitting off of nitrogen may be effected in known manner. The pyrazoline compound, for instance, may be subjected directly to a thermal decomposition, preferably in a high vacuum. Preferably, the recrystallized pyrazoline compound is heated for 30 to 60 minutes to 200 to 260° C. at a pressure of about 0.01 to 0.001 mm. The $\Delta^1$-1-methyl-compound is then isolated from the molten mass and purified, for instance by chromatography through aluminum oxide or silica gel. Another way of effecting the splitting off of nitrogen comprises carrying out the reaction in an organic solvent, such as carbon tetrachloride or chloroform in the presence of an adsorbent in an acid environment at room temperature or at elevated temperature, such as the temperature of the boiling point of the solvent. Suitable adsorbents are the adsorbents customarily used in adsorption chromatography, such as $Al_2O_3$ silica gel, bleaching earths, etc., which absorbents should be subjected to an acid treatment prior to the reaction in order to assure the necessary acid environment.

A preferred method for splitting off nitrogen comprises treating the 1,2-pyrazoline compound with an organic base, such as quinoline, isoquinoline, quinolidine, collidine, lutidine, N,N-dimethylaniline, aniline, and/or mixtures of these compounds. The reaction may be carried out in the presence of a diluent such as tetralin or dekalin. The reaction temperature in case high boiling-point bases are used should be above about 140° C. and preferably between 170 and 240° C. If bases are used with boiling-points below 140° C., the nitrogen elimination is preferably effected at an elevated pressure and a temperature of about 200° C. The reaction in all these methods is preferably carried out in the presence of an inert gas such as nitrogen or argon, in order to avoid the formation of undesirable composition products.

Another possibility for introducing the 1-methyl-$\Delta^1$-group is as follows:

The initial 17β-acyloxy-18-methyl-5α-androst-1-ene-3-one is converted to the 1α-hydroxy-17β-acyloxy-18-methyl - 5α-androstane-3-one by following the procedure of German Pat. 1,154,467, which provides first for formation of the 1-hydroxy-2-halogen compound and then reductive elimination of the 2-position halogen, for instance by employing zinc-dust in alcohol, or by means of a catalytic hydrogenation, for instance in the presence of Pd/$CaCO_3$ and sodium acetate and a small amount of acetic acid. The 1α-hydroxy group is then ketalized in the 3-position, following the procedure of German Pat. 1,152,-103. The 1 - hydroxy compound is then oxidized with chromic acid while dissolved in a suitable solvent such as acetone, glacial acetic acid, tetrahydrofuran-glacial acetic acid, pyridine, dimethylformamide, etc. The thus formed 1-keto group is then reacted in the usual manner with methylmagnesium halide and the thus obtained Grignard product is thereupon subjected to an acid treatment, for instance with a methanol solution of hydrochloric or sulfuric acid. The 3-ketal group is thus hydrolyzed and the 1-hydroxyl group is at the same time split off as water, together with a 2-position hydrogen atom resulting in the formation of a $\Delta^1$-double bond.

TESTS CONCERNING ACTIVITY

The compounds of the invention, as already pointed out, have a strong anabolic action and are furthermore distinguished by an excellent dissociation of the desired anabolic main action from the undesirable androgenous side effect. This is further evidenced by the following Table, in which the Compounds IV, VI and VII illustrate the compounds of the invention and are compared with prior art Compounds I to III. As appears, the Compound V of the invention, in addition to a strong anabolic effect, has also a strong androgenic action.

The results were obtained by the usual seminal vesicle and the Levator ani tests after subcutaneous application of the effective agent in the doses indicated to rats.

TABLE

| Test No. | Compound | Dose, mg./ animal/ day | Weight of body parts (mg./kg./ body part) | |
|---|---|---|---|---|
| | | | Levator ani | Seminal vesicle |
| I | 17β-propionyloxy-4-androstene-3-one. | 1.0 | 55 | 529 |
| II | 17β-acetoxy-5α-androstane-3-one. | 1.0 | 51 | 401 |
| III | 17β-acetoxy-1-methyl-5α-androst-1-ene-3-one. | 1.0 | 51 | 371 |
| IV | 17β-acetoxy-18-methyl-5α-androstane-3-one. | 1.0 | 51 | 284 |
| V | 17β-acetoxy-17-methyl-5α-androst-1-ene-3-one. | 1.0 | 70 | 500 |
| VI | 17β-acetoxy-1-18-dimethyl 5α-androst-1-ene-3-one. | 1.0 | 50 | 132 |
| VII | 1α-hydroxy-17β-acetoxy-18-methyl-5α-androstane-3-one. | 1.0 | 52 | 248 |

PHARMACEUTICAL COMPOSITIONS AND USE

The compounds of the invention may be applied orally or by parenteral injection. For oral application, pharmaceutical compositions can be formed by combining the active agent of the invention with a carrier substance or flavoring additives, such as are used in Galenical pharmacology, and the compositions may then be put up in the desired final form, such as tablets, lozenges, powders, capsules, etc. For parenteral injection, the active compounds are dissolved preferably in an oil, such as sesame oil or castor oil, following the conventional methods of Galenical pharmacology. In order to increase the solubility, diluents or solution promoters may be added to the solvents, such as benzylbenzoate. The solutions can be put up in the usual manner by filling them under sterile conditions into ampoules holding, for instance, 1 to 2 ml.

The compounds of the invention are useful wherever treatment with anabolic agents is desired, such as in case of general convalescence, conditions resulting from rickets, long-term therapy with corticoids, osteoporosis, liver and kidney ailments, diabetic retinopathy growth abnormalities.

The pharmaceutical compositions should contain an amount of active ingredient so as to supply a dosage of between 0.5 and 60 mg., preferably between 5 and 20 mg., per day in case of oral administration. In case of parenteral administration, the dosage should be between 0.1 and 50 mg. per day.

STARTING PRODUCTS

As already indicated, a suitable starting product for making the compounds of the invention is 17β-hydroxy-18-methyl-4-androstene-3-one and its 17-ester. The racemic form of this product is known, see "J. Med. Chem.," 10, 446 (1967). If it is desired to obtain the compounds of the invention in their optically active form, the making of the compounds also proceeds from the corresponding optically active starting product.

In order to make the starting product, one proceeds from 17-acetoxy-18-methyl-5(10)-estrene - 3 - one (M.P. 145–146° C.). This product in turn can be formed from 3-methoxy-17β-acetoxy - 18-methyl - 1,3,5(10),8,14 - estrapentaene by catalytic hydrogenation of the $\Delta^{14}$-double bond, Birch reduction and subsequent 17β-acetylation to obtain the corresponding 3 - methoxy-$\Delta^{2,5(10)}$-17β-acetoxy compound (M.P. 136.5–139° C.) and 3-enolether splitting. There is thus obtained 17-acetoxy-18-methyl - 5(10)-estrene-3-one.

5 grains of this latter compound are then reduced in 50 ml. tetrahydrofuran and 5 ml. water with 0.5 g. sodium borhydride for a period of 30 minutes at room temperature. The reaction mixture is then made slightly acidic with 2 N H$_2$SO$_4$, whereupon the product is precipitated in icewater and the precipitate is removed by suction, washed neutral and dried. The crude product is separated by gradient chromatography (hexane-20% acetic acid ester) through 500 g. neutral aluminum oxide into 17β-acetoxy-18-methyl-5(10)-estrene-3β-ol (after one recrystallization from hexane- acetone; M.P. 103–104° C.) and 17β-acetoxy-18-methyl-5(10)-estrene-3β-ol (after recrystallization from hexane-acetone; M.P. 103.5–105° C.).

10 g. of 17β-acetoxy-18-methyl-5(10)-estrene-3β-ol are then dissolved in 70 ml. 1,2-dimethoxyethane and are added, dropwise, to a suspension formed by 50 ml. abs. ether, 10 ml. methyleneiodide and 10 g. zinc-coppercouple (E. Le Goff, "J. Org. Chem.," 29, 2048 [1964]). The product is subjected to reflux distillation for 2 hours, it is then diluted with 250 ml. chloroform and 50 ml. methanol and subjected to filtration of the non-dissolved metal. The filtrate is washed with aqueous ammonium chloride solution, aqueous sodium thiosulfate solution and water, dried over sodium sulfate and concentrated to dryness. The residue is recrystallized from diisopropylether. There are thus obtained 8.8 g. 17β-acetoxy-18-methyl-5,10β-methylene-5β-estrane-3β-ol, M.P. 131–131.5° C.

330 mg. of the latter product are subjected to oxidation in 25 ml. acetone with 0.5 ml. of a Jones oxidizing solution (267 g. CrO$_3$, 220 ml. conc. sulfuric acid brought up to 1,000 ml. with water). The oxidation is carried out at room temperature for a period of 5 minutes, followed by precipitation in ice-water. The precipitate is then taken up in chloroform and the separated organic phase is washed with an aqueous sodium bicarbonate solution and water. The chloroform solution concentrated to dryness after drying over sodium sulfate. There are thus obtained 330 mg. of 17β-acetoxy-18-methyl-5,10β-methylene-5β-estrane-3-one (M.P. 141–144° C.).

If it is desired to use as a starting product a compound having a 17-position free hydroxyl group, it is necessary to saponify the 17β-acetoxy-group of the 17β-acetoxy-18-methyl-5,10 β-methylene-5β-estrane-3-one in the usual manner in order to form the 17β-hydroxyl group.

The intermediate product of the first stage of this series of process steps, 17β-acetoxy-18-methyl-5(10)-estrene-3α-ol, can further be converted in conventional manner into the 17β-acetoxy - 18 - methyl-5(10) - estrene-3β - ol and thereby is preserved for the manufacture of the true starting product:

3 g. 17β-acetoxy-18-methyl-5(10)-estrene-3α-ol are dissolved in 30 ml. abs. pyridine and reacted with 3 ml. methanesulfochloride while cooling with ice. The solution is left standing for about 16 hours at 0° C., is then precipitated in ice-water and subjected to stirring for another hour, whereupon 190 ml. of ice-cold 2 N H$_2$SO$_4$ are added and the precipitate obtained is distilled off. After washing with water, the product is again dissolved in benzene and the benzene solution is washed with aqueous sodium bicarbonate solution and water until neutral and is then dried over sodium sulfate and finally concentrated to dryness. The residue is recrystallized from isopropylether.

There is thus obtained 3α-methoxy-17β-acetoxy-18-methyl-5(10)-estrene having a melting point between 145 and 146° C. 2.5 g. of this compound and 4 g. of tetraethylammoniumformate are heated under reflux for about 16 hours in 100 ml. abs. acetone. The solution, after adding 500 ml. benzene, is washed with water until neutral, dried over sodium sulfate and concentrated to dryness. The residue obtained is an oil which consists of 3β-formyl-oxy-17β-acetoxy-18-methyl - 5(10)-estrene and a mixture of dienes. This total mixture is dissolved in 200 ml. ethanol and the solution is reacted with 20 ml. of saturated aqueous sodium bicarbonate solution and is heated upon reflux for 30 minutes in the presence of a nitrogen atmosphere. The solution is then concentrated to half its volume and precipitated in icewater, whereupon the formed precipitate is removed by filtration and taken up in methylenechloride. The methylene-chloride solution, after washing with water until neutral and drying over sodium sulfate, is then concentrated to dryness. The residue is finally separated with 250 g. of silica gel by means of gradient chromatography (hexane-20% acetone). There is thus obtained further 17β-acetoxy-18-methyl-5(10)-estrene-3β-ol of a melting point between 103 and 104° C. 300 mg. of 17β-acetoxy-18-methyl-5,10β-methylene-5β-estrane-3-one are heated for 1 hour on a steam bath of about 70° C. in 30 ml. acetic acid/conc. hydrochloric acid (in a ratio of 3:2). The product is subsequently precipitated in ice-water and extracted with methylenechloride. The organic phase is washed with aqueous sodium bicarbonate solution and water until neutral, then dried over sodium sulfate, and finally concentrated to dryness. The remaining residue is dissolved in 20 ml. methanol, then 3 ml. water and 100 mg. potassium carbonate are added and the solution is now refluxed for 90 minutes in the presence of a nitrogen atmosphere. It is then concentrated to half its volume, precipitated in ice-water and extracted with methylenechloride.

The several methylenechloride extracts are combined, washed with water until neutral, dried over sodium sulfate and finally concentrated to dryness. The residue is recrystallized from diisopropylether. There are thus obtained 206 mg. 17β-hydroxy-18-methyl-4-androstene-3-one, M.P. 175/176.5–177.5° C.; UV (methanol): $\epsilon_{240}$=16,300.

100 mg. of the latter compound are then acetylated with 0.4 ml. abs. pyridine and 0.2 ml. acetic acid anhydride at room temperature for a period of 16 hours. The solution is then concentrated to dryness in a vacuum. The remaining residue is recrystallized from diisopropylether. There are thus obtained 98 mg. of 17β-acetoxy-18-methyl-4-androstene-3-one, M.P. 114–116° C., UV (methanol): $\epsilon_{240}$=15,900.

100 mg. 17β-hydroxy-18-methyl - 4-androstene-3-one are esterified with propionic acid anhydride. After the corresponding treatment, as discussed, there are obtained 85 mg. of 17β-propionyloxy-18-methyl-4-androstene-3-one, M.P. 119–120° C. (from diisopropylether); UV (methanol): $\epsilon$=15,800.

100 mg. of 17β-hydroxy-18-methyl-4-androstene-3-one are dissolved in 0.4 ml. abs. pyridine and reacted with 0.2 ml. n-heptoic acid anhydride. After letting the solution stand for 24 hours at room temperature, the reaction mixture is precipitated with ice-water and extracted with ether. The saturated ether solution is then washed successively with 1 N HCl solution, aqueous sodium bicarbonate solution and water and is furthermore dried over sodium sulfate. After evaporation of the solvent, there is obtained 17β-heptoanoyloxy-18-methyl-4-androstene-3-one in the form of an oil. UV (methanol): $\epsilon_{240}=15,200$.

The following examples will illustrate the invention:

EXAMPLE 1

A solution of 15 g. 17β-acetoxy-18-methyl-4-androstene-3-one in 200 ml. abs. ether/abs. dioxane (in a ratio of 1:1) was added, dropwise, at 70° C., to a solution of 1500 ml. liquid ammonia and 4.5 g. lithium. The solution was then subjected to stirring for 30 minutes at −70° C., whereupon 30 g. solid ammonium chloride were added within a period of 30 minutes until the blue color had disappeared, whereupon the ammonia was permitted to evaporate. The solution, after adding 500 ml. ether, was washed successively with 1 N HCl, water, aqueous sodium bicarbonate solution and water, dried over sodium sulfate and concentrated to dryness after filtration. The residue was adsorbed in 500 g. silica gel and after gradient elution (hexane-10% acetone) there were obtained 9 g. 17β-acetoxy-18-methyl-5α-androstane-3-one, which after recrystallization from diisopropylether had a melting point between 158.5 and 159.5° C.

EXAMPLE 2

1.5 g. 17β-acetoxy-18-methyl - 5α-androstane-3-one were dissolved in 20 ml. methanol. The solution was reacted with 3 ml. water and 1.5 g. potassium carbonate and refluxed for 90 minutes upon heating in the presence of a nitrogen atmosphere. It was then subjected to precipitation in ice-water and the formed precipitate was removed by filtration, washed with water and concentrated to dryness in a vacuum at 60° C. After recrystallization from diisopropylether, there were obtained 1.02 g. 17β-hydroxy - 18 - methyl-5α-androstane-3-one having a melting point between 171/171.5 and 172° C.

EXAMPLE 3

305 mg. 17β-hydroxy-18-methyl-5α-androstane-3-one were heated together with 1.5 ml. abs. pyridine and 0.61 ml. propionic acid anhydride for 90 minutes on a steam bath. The reaction mixture was subsequently poured into ice-water and extracted with methylenechloride. The separated methylenechloride solution was successively washed with 1 N HCl, water, aqueous sodium bicarbonate solution and water, then dried over sodium sulfate and finally concentrated to dryness. After filtration, the residue was recrystallized from hexane-acetone. There were thus obtained 270 mg. 17β-propionyloxy-18-methyl-5α-androstane-3-one having a melting point of 141/141.5–142.5° C.

EXAMPLE 4

100 mg. 17β-hydroxy-18-methyl-5α-androstane-3-one were dissolved in 0.4 ml. abs. pyridine and reacted with 0.2 ml. n-heptoic acid anhydride. After letting the solution stand at room temperature for 24 hours, it was precipitated in ice-water and extracted with ether. The separated ether solution was successively washed with 1 N HCl solution, water, aqueous sodium bicarbonate solution and water and dried over sodium sulfate. After evaporation of the solvent, there were obtained 120 mg. 17β-heptanoyloxy-18-methyl-5α-androstane-3-one in the form of an oil.

EXAMPLE 5

23 g. 17β-acetoxy-18-methyl-5-α-androstane-3-one were dissolved in 250 ml. tetrahydrofuran and reacted with 3.35 ml. bromine in 35 ml. glacial acetic acid during a period of 15 minutes. The solution was then stirred for 10 minutes and the reaction product was precipitated in ice-water. The product was taken up in methylenechloride and the solution washed successively with aqueous sodium bicarbonate solution and water, dried over sodium sulfate and concentrated to dryness in a vacuum. The thus obtained 2 - bromo-17β-acetoxy-18-methyl-5α-androstane-3-one was then stirred, in its crude form, into 200 ml. dimethylformamide for 5 hours at 115° C. and in a nitrogen atmosphere together with 10 g. calcium carbonate and 5.8 g. lithium bromide. The reaction mixture was precipitated in ice-water and the solution was acidified with 2 N HCl and then extracted with methylenechloride. The solution was successively washed with aqueous sodium bicarbonate solution and water, dried over sodium sulfate and concentrated to dryness in a vacuum. The residue from these operations was adsorbed with 1 kilogram silica gel. After gradient chromatography with methylenechloride/2% methanol, there were obtained 14 g. 17β - acetoxy - 18-methyl-5-α-androst-1-ene-3-one, M.P. 128/129–130.5° C.; UV (methanol): $\epsilon_{229}=10,500$.

EXAMPLE 6

10 g. 17β - acetoxy-18-methyl-5α-androst-1-ene-3-one were dissolved in 180 ml. methanol. The solution was reacted with 18 ml. water and 12.5 g. potassium carbonate and was refluxed while boiling in a nitrogen atmosphere for 90 minutes. The product was then slowly precipitated in ice-water, removed by filtration, washed with water, dried, and recrystallized from hexane/diethylether. There was thus obtained 17β-hydroxy-18-methyl-5α-androst-1-ene-3-one; $K_1=7.8$ g.; M.P. 147/148-149° C:; UV (methanol): $\epsilon_{230}=9850$.

EXAMPLE 7

In the same manner as in Example 3, 1 g. 17β-hydroxy-18-methyl-5α-androst-1-ene-3-one were esterified with propionic acid anhydride. After the corresponding treatment, there were obtained 670 mg. 17β-propionyloxy-18-methyl-5α-androst-1-ene-3-one; M.P. 113–115° C. (from hexane/diethyl ether). UV (methanol): $\epsilon_{230}=10,700$.

EXAMPLE 8

100 mg. 17β-hydroxy-18-methyl-5α-androst-1-ene-3-one were esterified with 0.4 ml. abs. pyridine for 16 hours at room temperature with 0.2 ml. n-heptoic acid anhydride. After the corresponding treatment, there were obtained 115 mg. 17β-heptanoyloxy-18-methyl-5α-androst-1-ene-3-one in the form of an oil; UV (methanol): $\epsilon_{230}=9,400$.

EXAMPLE 9

7.9 g. 17β - acetoxy-18-methyl-5α-androst-1-ene-3-one were dissolved in 316 ml. dioxane and reacted with 79 ml. water, 7.9 g. N-bromosuccinimide and 7.9 ml. 70% perchloric acid. The solution was subjected to stirring at room temperature for 2.5 hours and the product was precipitated in ice-water/sodium chloride/sodium bicarbonate. The reaction product was extracted with methylene-chloride and the solution was washed with aqueous sodium bicarbonate solution and water, dried over sodium sulfate and concentrated to dryness in a vacuum. After recrystallization from hexane/acetone there were obtained 6.3 g. 2 - bromo - 1α-hydroxy-17β-acetoxy-18-methyl-5α-androstane-3-one; M.P. 224–225° C. (decomposition).

A solution of 6 g. of the latter product in 400 ml. tetrahydrofuran/methanol (1:1) was reacted with 2.6 g. sodium acetate, 1.8 ml. acetic acid and 600 mg. palladium disposed on calcium carbonate (10% Pd). The solution was subjected to shaking under a hydrogen atmosphere in a hydrogenation apparatus for a time sufficient to permit taking up of the predetermined amount of hydrogen. The catalyst was then removed by filtration and the solution was subjected to substantial concentration in a vacuum, whereupon the reaction product was precipitated in ice-water. The formed precipitate was removed by suction, washed with water and dried. After adsorption on 300 g. silica gel and gradient elution with hexane/10% acetone, there were obtained 3.4 g. 1α-hydroxy-17β-acetoxy - 18 - methyl-5α-androstane-3-one; M.P. 193.5–194.5° C. (from hexane/acetone).

EXAMPLE 10

1.5 g. 1α - hydroxy - 17β - acetoxy-18-methyl-5α-androstane-3-one, 75 ml. abs. benzene, 4.5 ml. ethylene glycol and 37.5 mg. p-toluenesulfonic acid were refluxed for 5 hours in a nitrogen atmosphere and upon stirring and elimination of water. The benzene phase was washed neutral with water, dried over sodium sulfate, and concentrated to dryness in a vacuum. There were obtained 1.7 g. crude 3,3-ethylenedioxy-17β-acetoxy-18-methyl-5α-androstane-1α-ol.

This crude product was oxidized in 30 ml. acetone with 1.4 ml. chromic acid solution (267 g. chromiumtrioxide, 230 ml. conc. sulfuric acid and water to bring the solution up to 1,000 ml.). The oxidation step was carried out at 10° C. for 5 minutes. The oxidation solution was then stirred into ice water and the precipitate was taken up in methylenechloride. The methylenechloride solution was washed with aqueous sodium bicarbonate solution and water, dried over sodium sulfate and concentrated to dryness.

The remaining crude 3,3-ethylenedioxy-17β-acetoxy-18-methyl-5α-androstane-1-one was dissolved in 115 ml. of abs. benzene. This solution was added at room temperature, dropwise, to a Grignard solution made of 2.62 g. magnesium filings, 50 ml. abs. diethylether and 7.35 ml. methyliodide. The mixture was reacted after 4 hours stirring at room temperature with aqueous ammonium chloride solution. The organic phase was then separated and the aqueous phase was extracted twice with benzene. The combined benzene solutions were washed neutral with water, dried over sodium sulfate and concentrated to dryness. The remaining residue in an amount of 1.7 g. was refluxed for 35 minutes in 100 ml. methanol with 17 ml. sulfuric acid of a concentration of 80% by volume. The solution was then stirred into ice-water containing sodium carbonate and the product was then taken up in methylenechloride. The methylenechloride solution was washed neutral with water, dried over sodium sulfate and evaporated to dryness. The residue was acetylated with 10 ml. abs. pyridine and 5 ml. acetic acid anhydride for a period of 17 hours at room temperature. The solution was then precipitated in ice-water and the precipitate was taken up in diethylether. The ether solution was successively washed with 1 N HCl, water, aqueous sodium bicarbonate solution and water, and was dried over sodium sulfate. The remaining residue was then adsorbed on 100 g. silica gel after evaporation of the solvent. By gradient elution with hexane/10% acetone there were obtained 855 mg. 17β - acetoxy-1.18-dimethyl-5α-androst-1-ene-3-one; M.P. 107–110° C. (from hexane/acetone); UV (m-ethanol): $\epsilon_{242}=13{,}000$.

EXAMPLE 11

3 g. 17β - hydroxy - 18 - methyl-5α-androst-1-ene-3-one were added to a 300 ml. ethereal diazomethane solution which had been formed by decomposition of 50 g. nitrosomethylurea. After permitting the solution to stand for 3 days at room temperature, the excess diazomethane was destroyed with a small amount of acetic acid and the solution was concentrated to dryness. The crude product obtained of 17β-hydroxy-18-methyl-5α-androstano-[2.1α-c]-2'-pyrazolino-3-one was heated in 50 ml. quinoline at 170° C. for a period of 30 minutes. The reaction product was taken up in ether and the ether solution was successively washed with 4 N HCl, water, aqueous sodium bicarbonate solution and water, and was dried over sodium sulfate and concentrated to dryness. The residue from the evaporation was acetylated for 16 hours at room temperature with 12 ml. abs. pyridine and 6 ml. acetic acid anhydride. The reaction product was precipitated in ice-water and the product formed was taken up in methylenechloride and the methylenechloride solution was washed successively with 1 N HCl, water, aqueous sodium bicarbonate solution and water. The solvent was evaporated after drying over sodium sulfate and the residue was adsorbed on 300 g. silica gel. After gradient elution with hexane/10% acetone there were obtained 310 mg. 17β-acetoxy-1.18-dimethyl-5α-androst-1-ene-3-one; M.P. 106–109° C. (from hexane/acetone); UV (methanol):

$$\epsilon_{242}=12{,}900.$$

EXAMPLE 12

500 mg. 17β-acetoxy-1.18-dimethyl-5α-androst-1-ene-3-one were refluxed in 150 ml. methanol and 3 ml. water with 700 mg. potassium carbonate for a period of 2 hours in a nitrogen atmosphere. The reaction product was precipitated in ice-water, removed by filtration, and washed with water and dried. After recrystallization from hexane/diethylether there were obtained 320 mg. 17β-hydroxy-1.18-dimethyl-5α-androst-1-ene-3-one; M.P. 158–159° C.; UV (methanol): $\epsilon_{243}=13{,}200$.

EXAMPLE 13

300 mg. 17β-hydroxy-1,18-dimethyl-5α-androst-1-ene-3-one were esterified for 16 hours at room temperature in 10 ml. abs. pyridine with 5 ml. propionic acid anhydride. After precipitating the reaction product in ice-water, the product was extracted with diethylether and the ether solution was successively washed in 1 N HCl, water, aqueous sodium bicarbonate solution and water. After drying over sodium sulfate, the solvent was evaporated and there were obtained 17-propionyloxy-1.18-di-methyl-5α-androst-1-ene-3-one in the form of an oil; UV (methanol): $\epsilon_{242}=12{,}700$.

EXAMPLE 14

In a manner as described in Example 4, 100 mg. 17β-hydroxy-1.18-dimethyl-5α-androst-1-ene-3-one were esterified with n-heptoic acid. After the corresponding treatment, as described, there were obtained 125 mg. 17β-heptanoyloxy-1.18-dimethyl-5α-androst-1-ene-3-one in the form of an oil. UV (methanol): $\epsilon_{242}=12{,}000$.

EXAMPLE 15

18.5 g. 17β - acetoxy - 18 - methyl - 5α - androstane-3-one were dissolved in 200 ml. abs. tetrahydrofuran. 2.72 ml. bromine dissolved in 29 ml. acetic acid were then added dropwise to the steroid solution within a period of 15 minutes. After further 10 minutes, the reaction product was precipitated in ice-water and then taken up in methylenechloride. The organic phase was washed with aqueous sodium bicarbonate solution and water, dried over sodium sulfate, and concentrated to dryness. After recrystallization of the residue from hexane/acetone, there were obtained 15.6 g. 2α-bromo-17β-acetoxy-18-methyl-5α- androstane-3-one; M.P. 182–183° C.

A mixture, comprising 15.6 g. of the latter product, 200 ml. dimethylformamide, 6.75 g. calcium carbonate and 3.93 g. lithmium bromide were heated for 5 hours to 115° C. in a nitrogenatmosphere. The reaction product was then precipitated in ice-water and the solution was acidified with 2 N HCl, whereupon the precipitate was extracted with methylenechloride. The organic phase was washed with aqueous sodium bicarbonate solution and water, dried over sodium sulfate and evaporated to dryness. After recrystallization of the residue from hexane/acetone, there were obtained 9.8 g. 17β-acetoxy-18-methyl-5α - andros - 1 - ene - 3 - one; M.P. 129–130° C.; UV (methanol): $\epsilon_{229}=10{,}500$.

EXAMPLE 16

3.5 g. 17β-acetoxy-18-methyl-5α-androst - 1 - ene-3-one were dissolved in 60 ml. methanol and reacted upon cooling with ice with 1 ml. 10%-aqueous sodium hydroxide and 4 ml. of a 30% hydrogen peroxide solution. After 10 minutes at a temperature of 0° C., the reaction product was precipitated in ice-water, whereupon the formed precipitate was filtered off, washed with water and dried at 50° C. in a vacuum. After recrystallization from diisopropylether, there was obtained 17β-acetoxy-1α,2α-epoxy-18-methyl-5α-androstane-3-one; M.P. 157–158° C.

45 mg. lithium were dissolved in 50 ml. liquid ammonia. 200 mg. of the steroid obtained in the last-described step dissolved in 5 ml. tetrahydrofuran were then added, dropwise, to the lithium solution. After 30 minutes at −70° C, solid ammonium chloride was slowly added to decolorize the solution. The ammonia was then permitted to evaporate and the product was taken up in ether. The organic phase was thereafter washed with water and dried over sodium sulfate. After evaporation of the solvent and recrystallization of the residue from hexane/acetone, there were obtained 50 mg. 1α,17β-dihydroxy-18-methyl-5α-androstane-3-one; M.P. 205–209° C.

What is claimed as new and desired to be protected by Letters Patent is set forth in the appended claims.

1. A steroid compound of the formula

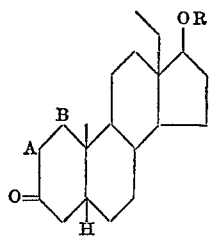

wherein A–B is a group selected from the following:

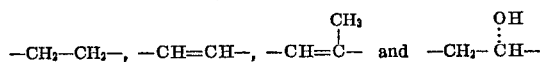

and wherein R is hydrogen or acyl.

2. The compound of claim 1 wherein acyl is derived from an aliphatic carboxylic acid having from 1 to 11 carbon atoms in the acid group thereof.

3. The compound of claim 2 wherein acyl is derived from acetic acid, propionic acid, caproic acid or undecylic acid.

4. The compound of claim 1 which is 17β-hydroxy-18-methyl-5α-androstane-3-one.

5. The compound of claim 1 which is 17β-acetoxy-18-methyl-5α-androstane-3-one.

6. The compound of claim 1 which is 17β-propionyloxy-18-methyl-5α-androstane-3-one.

7. The compound of claim 1 which is 17β-heptanoyloxy-18-methyl-5α-androstane-3-one.

8. The compound of claim 1 which is 17β-hydroxy-18-methyl-5α-androst-1-ene-3-one.

9. The compound of claim 1 which is 17β-acetoxy-18-methyl-5α-androst-1-ene-3-one.

10. The compound of claim 1 which is 17β-propionyloxy-18-methyl-5α-androst-1-ene-3-one.

11. The compound of claim 1 which is 17β-heptanoyloxy-18-methyl-5α-androst-1-ene-3-one.

12. The compound of claim 1 which is 17β-hydroxy-1.18-dimethyl-5α-androst-1-ene-3-one.

13. The compound of claim 1 which is 17β-acetoxy-1.18-dimethyl-5α-androst-1-ene-3-one.

14. The compound of claim 1 which is 17β-propionyloxy-1.18-dimethyl-5α-androst-1-ene-3-one.

15. The compound of claim 1 which is 17β-heptanoyloxy-1.18-dimethyl-5α-androst-1-ene-3-one.

16. The compound of claim 1 which is 1α-hydroxy-17β-acetoxy-18-methyl-5α-androstane-3-one.

17. The compound of claim 1 which is 1α,17β-dihydroxy-18-methyl-5α-androstane-3-one.

References Cited

UNITED STATES PATENTS

| | | | |
|---|---|---|---|
| 2,833,794 | 5/1958 | Goldkamp et al. | 260—397.4 |
| 2,851,454 | 9/1958 | Pappo et al. | 260—239.55 |
| 3,225,072 | 12/1965 | Deghenghi | 260—397.5 |
| 3,280,157 | 10/1966 | Legatt et al. | 260—397.4 |
| 3,296,285 | 1/1967 | Legatt et al. | 260—397.3 |
| 3,316,253 | 4/1967 | Wettstein et al. | 260—239.55 |
| 3,439,040 | 4/1969 | Jacques | 260—586 |

OTHER REFERENCES

Applezweig, Steroid Drugs II, p. 140 (1964).

HENRY A. FRENCH, Primary Examiner

U.S. Cl. X.R.

424—243

UNITED STATES PATENT OFFICE
CERTIFICATE OF CORRECTION

Patent No. 3,812,165           Dated May 21, 1974

Inventor(s) Hans-Detlef Berndt, Hermann Steinbeck and Rudolf Wiechert

It is certified that error appears in the above-identified patent and that said Letters Patent are hereby corrected as shown below:

In the formula appearing in claim 1, the solid line indicating the bond of H should be corrected so as to be a dotted line.

Signed and sealed this 5th day of November 1974.

(SEAL)
Attest:

McCOY M. GIBSON JR.            C. MARSHALL DANN
Attesting Officer                Commissioner of Patents